Patented Jan. 9, 1934

1,942,660

UNITED STATES PATENT OFFICE 1,942,660

PROCESS FOR THE PREPARATION OF GLUCONIC ACID AND ITS LACTONES

Richard Pasternack, Brooklyn, and William Ralph Giles, Richmond Hill, N. Y., assignors to Charles Pfizer & Company, Brooklyn, N. Y., a corporation of New Jersey No Drawing. Application June 6, 1932
Serial No. 615,760

17 Claims. (Cl. 260—112)

This invention relates to a process for the preparation of gluconic acid and its lactones, and is a continuation in part of our copending application S. N. 523,186, Process for the production of d-glucono δ-lactone, filed March 16, 1931, patented June 7, 1932, No. 1,862,511.

When an aqueous gluconic acid solution is concentrated, either by standing in a desiccator over a drying agent, or by evaporation in vacuo, or by evaporation at ordinary pressure, a syrupy substance results, which is a mixture of the free gluconic acid and both its lactones in equilibrium.

We have now found that by controlling the conditions of temperature and time, it is possible to vary the product resulting from the crystallization of such a solution. By forming an oversaturated aqueous gluconic acid solution and effecting crystallization at below 30° C. and preferably below 25° C., gluconic acid crystallizes out; by effecting crystallization of an oversaturated gluconic acid solution at between 30° and 70° C., glucono δ-lactone crystallizes out; and by effecting crystallization of an oversaturated aqueous gluconic acid solution at above 70° C. glucono γ-lactone crystallizes out. It is also possible to convert these substances into each other by bringing any one of them in contact with water.

However, to obtain any one of these compounds substantially free from the other, it is necessary to allow sufficient time for the desired conversion at the known rate from the one compound to the other. In no case should the rate of crystallization exceed the rate of formation of the desired compound in aqueous solution at a given temperature and concentration as, if this rate be exceeded, the other compound may be precipitated in unchanged form.

Establishment of equilibrium when starting with gluconic acid and forming the δ-lactone, or starting with δ-lactone and forming gluconic acid, is relatively rapid. On the other hand, establishment of equilibrium by forming or hydrolizing the γ-lactone proceeds relatively slowly, so that when the γ-glucono lactone is to be used or formed, the working conditions must be adjusted to its rate of hydrolysis or formation. In all cases the establishment of equilibrium is hastened by the higher temperature permissible for the compound sought.

The rates of hydrolysis of the two lactones are quite different; the initial speed of reaction with water for the δ-lactone being approximately eight times that of the γ-lactone. A two molar solution of glucono δ-lactone will come to equilibrium in about 90 minutes, while a two molar solution of the γ-glucono lactone will require about 120 hours. A very rapid evaporation of the solution at a temperature below 30° will give approximately the initial equilibrium mixture of gluconic acid and its lactones. At above 30°, a very rapid evaporation will give a mixture of the two lactones. For this reason mere evaporation to dryness of a gluconic acid solution is unsatisfactory and will not give the desired results.

Crystallization will be spontaneously effected by merely allowing the gluconic acid solution to stand at the desired temperature or temperature range, crystallization probably being effected by chance nucleation from atmospheric dust particles. However, agitation and/or seeding the solution with the respective compounds desired, or with an isomorph of the respective compounds desired, and at the predetermined temperature or temperature range, facilitates crystallization.

Gluconic acid and its lactones may be crystallized directly from a fermentation liquor obtained by fermenting glucose with a gluconic acid generating micro-organism, such as certain species of Acetobacter, Penicillium and Aspergillus, or the gluconic acid or either of its lactones may be transformed into the other by contact with water for a suitable length of time, and subsequent crystallization.

*Example I*

An oversaturated aqueous gluconic acid solution may be prepared by evaporating at any suitable temperature a gluconic acid fermentation liquor to about 55 to 90% concentration, preferably 70%, by weight of gluconic acid, and preferably under sub-atmospheric pressure since at higher temperatures discoloration of the fermentation liquor results. The oversaturated solution is then concentrated at below 30° C. and preferably at from 20 to 25° C. and crystallization is effected. Agitation and/or seeding with gluconic acid crystals facilitates crystallization. The gluconic acid crystals are white, substantially free of glucono δ-lactone and glucono γ-lactone, soluble up to about 40% in cold water, almost insoluble in alcohol and have a melting point of 117 to 118° C.

Example II

An aqueous solution of gluconic acid, as for instance a fermentation liquor, is concentrated to about 90% by weight of gluconic acid, (as shown by titration) at between 30 and 70° C., preferably with agitation and/or seeding with glucono δ-lactone. The crystallization preferably takes place at 30° C., and the crystalline glucono δ-lactone formed may be separated by centrifugation or other means, is substantially free of gluconic acid and glucono γ-lactone, and has a melting point of about 160° C. The mother liquor has a concentration of about 75 to 77% gluconic acid by titration and can be reconcentrated to obtain other crops of crystals.

Example III

Glucono δ-lactone is dissolved in water, and preferably in one part of water, and the process according to Example I is repeated. Theoretically, time should be allowed for hydrolysis of the glucono δ-lactone to form an equilibrium mixture, but the lactone hydrolizes so readily, that under factory operating conditions the rate of hydrolysis of the glucono δ-lactone exceeds the rate of crystallization of the gluconic acid.

Example IV

Glucono δ-lactone is dissolved in water, and preferably in about one part of water, concentrated as in Example I, with crystallization occurring at between 70 and 110° C., while allowing time for the glucono γ-lactone to form. The crystallization of the glucono γ-lactone should not be effected at a rate in excess of the very slow formation of the γ-lactone at the temperature chosen. If this rate is exceeded, the crystallized glucono γ-lactone will be greatly contaminated with glucono δ-lactone. The amount of glucono δ-lactone decreases with increased temperature and elapsed time.

Many modifications may be made without departing from the spirit and scope of the invention, and we are not to be limited to any specific concentration of aqueous solution, to any method of effecting the concentration or the crystallization of such solution, nor to a solution containing any specific proportions of gluconic acid or its lactones, but claim broadly the crystallization of gluconic acid from an oversaturated aqueous gluconic acid solution at below 30° C., the crystallization of glucono δ-lactone from an oversaturated aqueous gluconic acid solution at between 30 and 70° C., and the crystallization of glucono γ-lactone from an oversaturated aqueous gluconic acid solution at between 70 and 110° C.

The invention claimed is:

1. The process comprising forming an oversaturated aqueous gluconic acid solution and effecting crystallization within temperature ranges so selected as to determine the product of crystallization by excluding transition temperatures.

2. The process comprising forming an oversaturated aqueous gluconic acid solution and effecting crystallization within temperature ranges wholly included between 20° C. and 110° C., and so selected as to determine the product of crystallization by excluding the two transition points of 30° C. and 70° C.

3. The process comprising forming an oversaturated aqueous gluconic acid solution, and effecting crystallization at below 30° C. to crystallize out gluconic acid.

4. The process comprising forming an oversaturated aqueous gluconic acid solution, and effecting crystallization at between 30° and 70° C. to crystallize out glucono δ-lactone.

5. The process comprising forming an oversaturated aqueous gluconic acid solution, and effecting crystallization at between 70° and 110° C. to crystallize out glucono γ-lactone.

6. The process comprising concentrating an aqueous gluconic acid solution to oversaturation, and continuing the concentration at below 30° C. to crystallize out gluconic acid.

7. The process comprising concentrating an aqueous gluconic acid solution to oversaturation, and continuing the concentration at between 30° and 70° C. to crystallize out glucono δ-lactone.

8. The process comprising concentrating an aqueous gluconic acid solution to oversaturation, and continuing the concentration at between 70° and 110° C. to crystallize out glucono γ-lactone.

9. The process of preparing gluconic acid crystals, substantially free of glucono δ-lactone and glucono γ-lactone, comprising concentrating an aqueous gluconic acid solution containing in any proportion gluconic acid and both its lactones at below 30° C. to above the saturation point of gluconic acid.

10. The process of preparing glucono δ-lactone crystals, substantially free of gluconic acid and glucono γ-lactone, comprising concentrating an aqueous gluconic acid solution containing in any proportion gluconic acid and both its lactones at between 30° and 70° C. to above the saturation point of glucono δ-lactone.

11. The process of preparing glucono γ-lactone crystals containing some glucono δ-lactone comprising concentrating an aqueous gluconic acid solution at between 70° C. and 110° C. to above the saturation point of glucono γ-lactone, the amount of glucono δ-lactone decreasing with increasing temperature and elapsed time.

12. The process of preparing gluconic acid crystals comprising concentrating an aqueous gluconic acid fermentation liquor to 55 to 90% concentration by weight of gluconic acid, and continuing the concentration at between 20° to 30° C. while agitating and seeding with gluconic acid crystals to effect crystallization of gluconic acid.

13. The process of preparing glucono δ-lactone crystals comprising concentrating an aqueous gluconic acid fermentation liquor to about 90% concentration by weight of gluconic acid at between 30° and 70° C., and effecting crystallization of glucono δ-lactone while agitating.

14. The process of converting glucono δ-lactone to gluconic acid comprising dissolving glucono δ-lactone in water, concentrating such solution to 55 to 90% concentration by weight of gluconic acid at below 30° C. while agitating and seeding with gluconic acid crystals to effect crystallization of gluconic acid.

15. The process of converting glucono δ-lactone to glucono γ-lactone comprising dissolving glucono δ-lactone in water, concentrating such solution to about 85% concentration by weight of gluconic acid, and continuing the concentration at between 70° and 110° C. while allowing time for the formation of glucono γ-lactone.

16. Process comprising forming an oversaturated aqueous gluconic acid solution and isolating a member selected from the group consisting of gluconic acid, gluconic gamma-lactone and gluconic delta-lactone by direct crystallization within temperature ranges so selected as to determine the product by excluding transition temperatures, and removing the mother liquor.

17. Process comprising forming an oversaturated aqueous gluconic acid solution and isolating a member selected from the group consisting of gluconic acid, gluconic gamma-lactone and gluconic delta-lactone, by once crystallizing from the solution while it is held within a temperature range which excludes transition temperatures, and removing the mother liquor.

RICHARD PASTERNACK.
WILLIAM RALPH GILES.